United States Patent
Shen et al.

(10) Patent No.: US 8,983,244 B2
(45) Date of Patent: Mar. 17, 2015

(54) OPTICAL INTERFEROMETER

(75) Inventors: Jinxi Shen, San Ramon, CA (US);
Hiroaki Yamada, San Jose, CA (US);
David J. Chapman, San Jose, CA (US);
Shanrui Ren, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 387 days.

(21) Appl. No.: 13/361,683

(22) Filed: Jan. 30, 2012

(65) Prior Publication Data
US 2012/0195544 A1 Aug. 2, 2012

Related U.S. Application Data

(60) Provisional application No. 61/438,017, filed on Jan. 31, 2011.

(51) Int. Cl.
| | |
|---|---|
| *G02B 6/12* | (2006.01) |
| *G02B 6/26* | (2006.01) |
| *H04B 10/67* | (2013.01) |
| *G02F 2/00* | (2006.01) |
| *G02F 1/225* | (2006.01) |

(52) U.S. Cl.
CPC .............. *H04B 10/677* (2013.01); *G02F 2/00* (2013.01); *G02F 1/225* (2013.01); *G02F 2201/20* (2013.01)
USPC .............................................. 385/14; 385/39

(58) Field of Classification Search
None
See application file for complete search history.

(56) References Cited

U.S. PATENT DOCUMENTS

| | | | |
|---|---|---|---|
| 5,701,372 A | 12/1997 | Magel et al. | 385/24 |
| 6,275,625 B1 | 8/2001 | Bergmann | 385/18 |
| 7,259,901 B2 | 8/2007 | Parsons et al. | 359/237 |
| 7,389,055 B1 | 6/2008 | Rickard et al. | 398/206 |
| 7,411,725 B2 | 8/2008 | Suzuki et al. | 359/325 |
| 7,411,726 B2 | 8/2008 | Caplan | 359/325 |
| 7,433,604 B1 | 10/2008 | Kim et al. | 398/188 |
| 7,444,085 B2 | 10/2008 | Ikeuchi et al. | 398/202 |
| 7,480,091 B2 | 1/2009 | Hasegawa et al. | 359/325 |
| 7,489,874 B2 | 2/2009 | Liu et al. | 398/161 |
| 7,526,210 B2 | 4/2009 | Liu | 398/188 |
| 7,899,279 B2 * | 3/2011 | Nasu et al. | 385/14 |
| 8,111,994 B2 * | 2/2012 | Popovic | 398/82 |
| 2004/0101227 A1* | 5/2004 | Takabayashi et al. | 385/11 |
| 2005/0141814 A1* | 6/2005 | Efimov | 385/39 |
| 2007/0047966 A1* | 3/2007 | Hironishi et al. | 398/161 |
| 2007/0177151 A1 | 8/2007 | Isomura et al. | 356/477 |
| 2008/0152359 A1 | 6/2008 | Shioiri et al. | 398/202 |

(Continued)

OTHER PUBLICATIONS

Doerr et al., "Monolithic Demodulator for 40-Gb/s DQPSK Using a Star Coupler", Journal of Lightwave Technology, Vol. 24, No. 1, Jan. 2006.

*Primary Examiner* — Tina Wong
(74) *Attorney, Agent, or Firm* — JDS Uniphase Corporation

(57) ABSTRACT

An optical interferometer for demodulating a differential phase shift keying optical signal includes a planar lightwave circuit and at least one free space delay line optically coupled to the planar lightwave circuit. The planar lightwave circuit has a waveguide splitter, a waveguide coupler, and a phase adjuster. In operation, the splitter splits the optical signal into equal portions, the phase adjuster adjusts the relative phase of the optical signal portions, and the free space delay line provides one-bit delay between the portions of the optical signal. The delayed signals are mixed in the waveguide coupler. The free space delay line can be made variable for adjustment of the bit delay for operation at different bit rates, and/or for optimization of the interferometer performance.

17 Claims, 12 Drawing Sheets

(56) References Cited

U.S. PATENT DOCUMENTS

| | | | |
|---|---|---|---|
| 2009/0074427 A1 | 3/2009 | Liu | 398/205 |
| 2009/0097101 A1 | 4/2009 | Hasegawa et al. | 359/325 |
| 2009/0214226 A1 | 8/2009 | Mizuguchi et al. | 398/202 |
| 2009/0245785 A1 | 10/2009 | Asano et al. | 398/25 |

* cited by examiner

OPTICAL INTERFEROMETER

CROSS-REFERENCE TO RELATED APPLICATIONS

The present invention claims priority from U.S. provisional patent application No. 61/438,017, filed Jan. 31, 2011, which is incorporated herein by reference.

TECHNICAL FIELD

The present invention relates to optical interferometers, and in particular to interferometers used in differential phase shift keying (DPSK) optical demodulators.

BACKGROUND OF THE INVENTION

In optical communications, optical signals are encoded with digital information at a transmitter site, propagated towards a receiver site, and decoded at the receiver site. The optical signals are encoded by modulating amplitude and/or phase of the signals. Phase modulation generally allows for a better bandwidth utilization. However, phase modulated signals are more difficult to decode, because the decoding requires a transformation of phase modulation into amplitude modulation that can be detected. To transform the phase modulation into the amplitude modulation, a reference optical signal is mixed with the transmitted phase-modulated signal in an optical interferometer. The amplitude-modulated interference signal is then detected by a photodetector.

One can use the optical signal itself as the reference optical signal. In a so-called differential phase shift keying (DPSK) interferometer, a transmitted optical signal is split into two portions of equal amplitude, one portion is delayed relative to the other portion by a time delay corresponding to duration of one bit of information, and the two portions are combined to provide an optical interference signal. Referring to FIG. 1A, a planar lightwave circuit (PLC) DPSK interferometer 100 of prior art includes a 1×2 waveguide splitter 102, upper and lower waveguides 104 and 105, respectively, and a 2×2 optical coupler 106. A phase-modulated optical signal 108 is coupled to an input port 101 of the DPSK interferometer 100. The optical signal 108 is split by the 1×2 waveguide splitter 102 into two portions 109 and 110 of equal amplitude, which propagate in the upper and lower waveguides 104 and 105, respectively. Since the upper waveguide 104 is longer than the lower waveguide 105, the portion 109 will be delayed relative to the portion 110. The lengths difference of the upper and lower waveguides 104 and 105 is selected so as to delay the portion 109 by one bit duration of the phase-modulated signal 108. The two portions 109 and 110 interfere with each other in the 2×2 optical coupler 106. A differential photodetector pair 114 is coupled to output waveguides 111 and 112 of the 2×2 optical coupler 106 to detect an interference signal.

Turning now to FIG. 1B, the optical signal portions 109 and 110 are illustrated by means of phase and amplitude time diagrams 121 and 122; 123 and 124, respectively. The lower phase diagram 123 illustrates the optical signal portion 109, which is the portion 110 delayed by one bit. An amplitude time diagram 125 illustrates time dependence of the interference signal's amplitude. When phases of the optical signal portions 109 and 110 are equal, the amplitude is equal to 1.0 due to constructive interference, and when the phases are opposite (that is, one is $\pi$, and the other one is 0), the amplitude is equal to 0 due to destructive interference. The amplitude-modulated signal 125 can be detected by the differential photodetector pair 114.

By using four values of phase, 0, $\pi/2$, $\pi$, and $3\pi/2$, one can further improve bandwidth utilization of optical phase modulation. This variety of DPSK modulation is termed differential quadrature phase shift keying (DQPSK) modulation. Referring to FIG. 2, a prior-art DQPSK interferometer 200 is shown. The DQPSK interferometer 200 includes the 1×2 splitter 102 coupled to two DPSK interferometers 201 and 202 having branch waveguides 204, 205, 206, and 207 providing phase delays of 0, $\pi/2$, $\pi$, and $3\pi/2$, respectively, the long branch waveguides 204 and 206 providing additional one-bit delays relative to the short branch waveguides 205 and 207. Phase shifters, not shown, are used to fine tune phase delays in the branch waveguides 204, 205, 206, and 207. Two differential photodetector pairs 114 are used to detect the optical interference signals.

The PLC-based DPSK and DQPSK interferometers 100 and 200 share a common drawback of temperature dependence of the phase shifts, as well as polarization sensitivity. Complicated temperature control is usually required to achieve a reliable and stable operation of PLC devices. In U.S. Pat. No. 7,259,901 by Parsons et al., PLC interferometers of different branch length, one providing a delay slightly bigger than a bit delay, and the other providing a delay slightly smaller than the bit delay, are used to tune a PLC interferometer by uniformly varying temperature of the entire PLC chip. In US Patent Application Publication US2007/0177151 by Isomura et al., a separate heating elements and a highly conductive, thermally matched spacer are used to control temperature of the PLC chip with precision required for stable and reliable phase demodulation.

A free-space Michelson interferometer, which is not as sensitive to temperature as the PLC interferometers 100 and 200, can be used for DPSK demodulation of optical signals. Referring now to FIG. 3, a Michelson interferometer 300 includes a half mirror 302 having 50% reflectance and first and second mirrors 304 and 306 spaced from the half-mirror 302 by distances L and L+c$\Delta$t/2, where $\Delta$t is bit duration and c is speed of light. A free space optical beam 301, carrying the phase-modulated signal, impinges on the half-mirror 302. Output interference signals 308 and 310 are detected by separate photodetectors, not shown. Michelson interferometer DPSK/DQPSK demodulators are known. By way of example, Michelson interferometer DPSK/QPSK demodulators have been disclosed in U.S. Pat. No. 7,411,725 by Suzuki et al. and in U.S. Pat. Nos. 7,489,874 and 7,526,210 by Liu. Detrimentally, Michelson interferometers of the prior art tend to be bulky and have a slow phase delay adjustment time as compared to their PLC counterparts. Furthermore, the prior-art PLC interferometers 100 and 200, and the prior-art Michelson interferometer 300 art can only operate at a single fixed bit rate of a phase-modulated optical signal. A different interferometer is required to operate at a different bit rate.

It is a goal of the present invention to provide a DPSK/DQPSK interferometer that would combine a compact size, a good thermal stability, and quick phase delay adjustment time with an option to adjust or switch the bit delay for operation at different bit rates.

SUMMARY OF THE INVENTION

An optical interferometer of the invention for demodulating a differential phase shift keying (DPSK) optical signal includes a planar lightwave circuit (PLC) chip having a splitter, a coupler, and a phase adjuster integrally formed therein, and at least one free space delay line optically coupled to the PLC. In operation, the splitter splits the optical signal into equal portions, the phase adjuster adjusts the relative phase of the optical signal portions, and the free space delay line provides one-bit delay between the portions of the optical signal. The delayed signals are mixed in the PLC coupler. The free space delay line can be made variable to adjust the bit delay for operation at different bit rates, and/or for optimization of the interferometer performance during calibration and/or operation in the field.

In accordance with the invention there is provided an optical interferometer comprising:
a planar lightwave circuit including
an input port, first and second intermediate ports, and first and second output ports;
an optical waveguide splitter comprising an input waveguide coupled to the input port and first and second output waveguides, for splitting an input optical signal coupled to the input port and propagating in the input waveguide into first and second optical signals propagating in the first and second output waveguides of the splitter, respectively, wherein the second output waveguide of the splitter is coupled to the first intermediate port;
an optical waveguide coupler comprising first and second input waveguides and first and second output waveguides, wherein the first input waveguide of the coupler is coupled to the first output waveguide of the splitter, the second input waveguide of the coupler is coupled to the second intermediate port, and the first and second output waveguides of the coupler are coupled to the first and second output ports, respectively; and
a phase shifting element for generating a relative optical phase shift between optical signals propagating in the first and second input ports of the coupler; and
a first free space optical delay line coupled between the first and the second intermediate ports of the planar lightwave circuit, for delaying the second optical signal relative to the first optical signal by a delay time corresponding to a bit duration of the input optical signal.

In one embodiment, the free space optical delay line is variable to accommodate different bit rates of the optical signal. Also in one embodiment, the planar lightwave circuit comprises third and fourth intermediate ports coupled to the first output waveguide of the splitter and the first input waveguide of the coupler, respectively. An interferometer of the latter embodiment further includes a second free space optical delay line coupled between the third and the fourth intermediate ports of the planar lightwave circuit, for delaying the first optical signal relative to the second optical signal.

In accordance with another aspect of the invention there is further provided an optical interferometer comprising:
a planar lightwave circuit including
an input port, first, second, third, and fourth intermediate ports, and first, second, third, and fourth output ports;
an optical waveguide splitter comprising an input waveguide coupled to the input port and first, second, third, and fourth output waveguides, for splitting an input optical signal coupled to the input port and propagating in the input waveguide into first, second, third, and fourth optical signals propagating in the first, second, third, and fourth output waveguides, respectively, of the splitter, wherein the fourth and the third output waveguides of the splitter are coupled to the first and the second intermediate ports, respectively;
an optical waveguide coupler comprising first, second, third, and fourth input waveguides and first, second, third, and fourth output waveguides,
wherein the first and the second output waveguides of the splitter are coupled to the third and the first input waveguides of the coupler, respectively;
wherein the fourth and the second input waveguides of the coupler are coupled to the third and the fourth intermediate ports, respectively; and
wherein the first, the second, the third, and the fourth output waveguides of the coupler are coupled to the first, the second, the third, and the fourth output ports, respectively; and
at least three phase shifting elements for generating relative optical phase shifts between the first and the second; the second and the third; and the third and the fourth optical signals propagating in the respective input ports of the coupler; and
a first free space optical delay line coupled between the first and the fourth intermediate ports; and between the second and the third intermediate ports of the planar lightwave circuit, for delaying the third and the fourth optical signals relative to the first and the second optical signals by a delay time corresponding to a bit duration of the input optical signal.

In one embodiment, the free space optical delay line is variable to accommodate different bit rates. Also in one embodiment, the interferometer further comprises fifth, sixth, seventh, and eights intermediate ports coupled to the third and the first input waveguides of the coupler and the second and the first output waveguides of the splitter, respectively. An interferometer of the latter embodiment further includes a second free space optical delay line coupled between the fifth and the eighth; and the sixth and the seventh intermediate ports of the planar lightwave circuit, for delaying the first and the second optical signals relative to the third and the fourth optical signals.

In accordance with another aspect of the invention, there is further provided a method of differential phase shift keying demodulation of a first phase-modulated optical signal having a first bit duration, the method comprising:
(a) providing a planar waveguide circuit optically coupled to a free space delay line, the planar waveguide circuit having a waveguide splitter, a phase shifter, and a waveguide coupler integrally formed therein;
(b) receiving the first optical signal in the planar waveguide circuit;
(c) splitting the first optical signal into two parts of substantially equal magnitude using the waveguide splitter;
(d) adjusting relative optical phase of the two parts of the first optical signal using the phase shifter;
(e) delaying one of the two parts relative to the other of the two parts of the first optical signal by a time substantially equal to the first bit duration, using the free-space delay line; and
(f) upon completion of steps (b) through (e), coherently mixing the two parts of the first optical signal in the waveguide coupler.

In one embodiment, the method further includes steps of
(g) receiving a second phase-modulated optical signal in the planar waveguide circuit the second signal having a second bit duration different from the first bit duration;
(h) splitting the second optical signal into two parts of substantially equal magnitude using the waveguide splitter;
(i) adjusting relative optical phase of the two parts of the second optical signal using the phase shifter;
(j) adjusting the free-space delay line to provide a delay substantially equal to the second bit duration;
(k) upon completion of step (j), delaying one of the two parts relative to the other of the two parts of the second optical signal by a time substantially equal to the second bit duration, using the free-space delay line; and
(l) upon completion of steps (g) through (k), coherently mixing the two parts of the optical signal in the waveguide coupler.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1A:
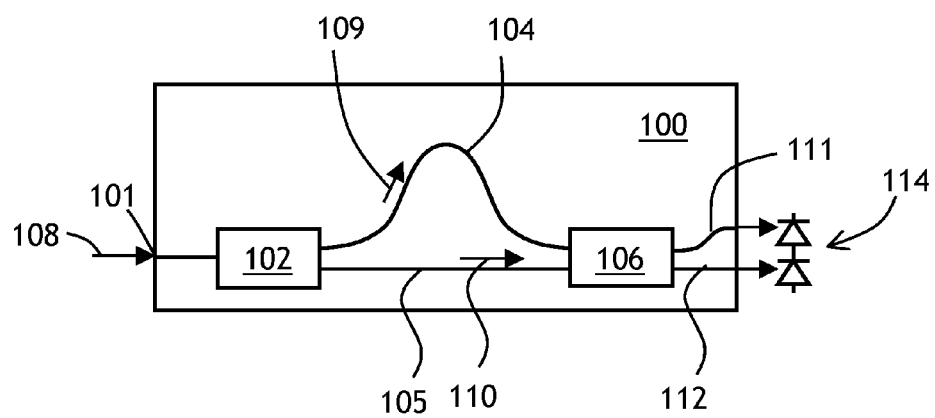
FIG. 1A is a plan view of a prior-art planar lightwave circuit (PLC) differential phase shift keying (DPSK) interferometer.
Figure 1B:
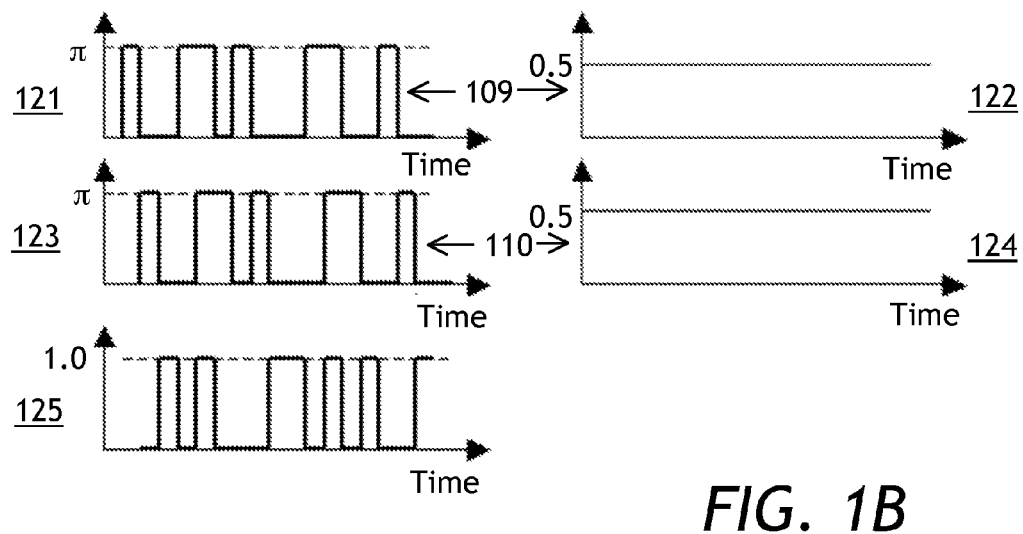
FIG. 1B shows a plurality of time traces of amplitude and phase of optical signals in the DPSK interferometer of FIG. 1.
Figure 2:
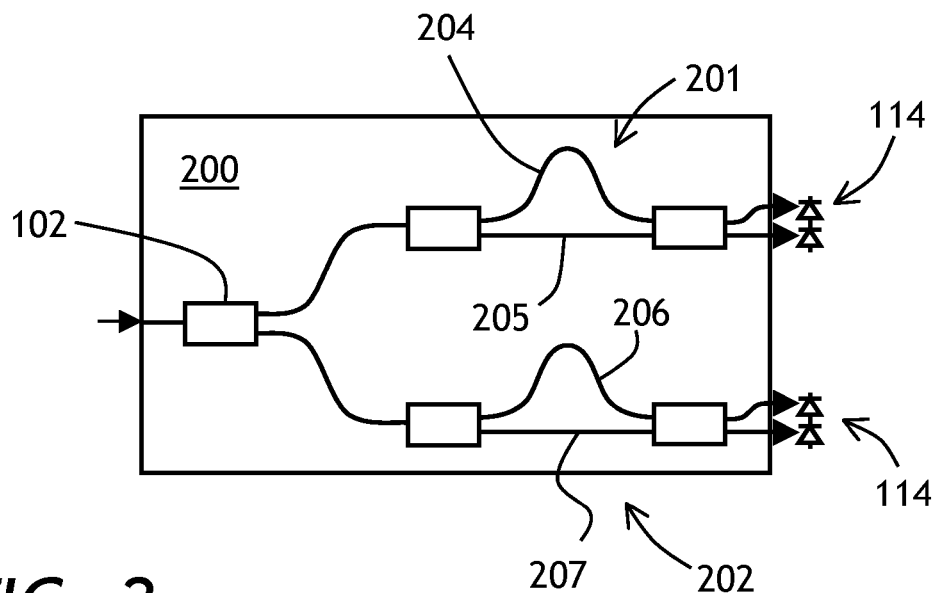
FIG. 2 is a plan view of a prior-art PLC differential quadrature phase shift keying (DQPSK) interferometer.
Figure 3:
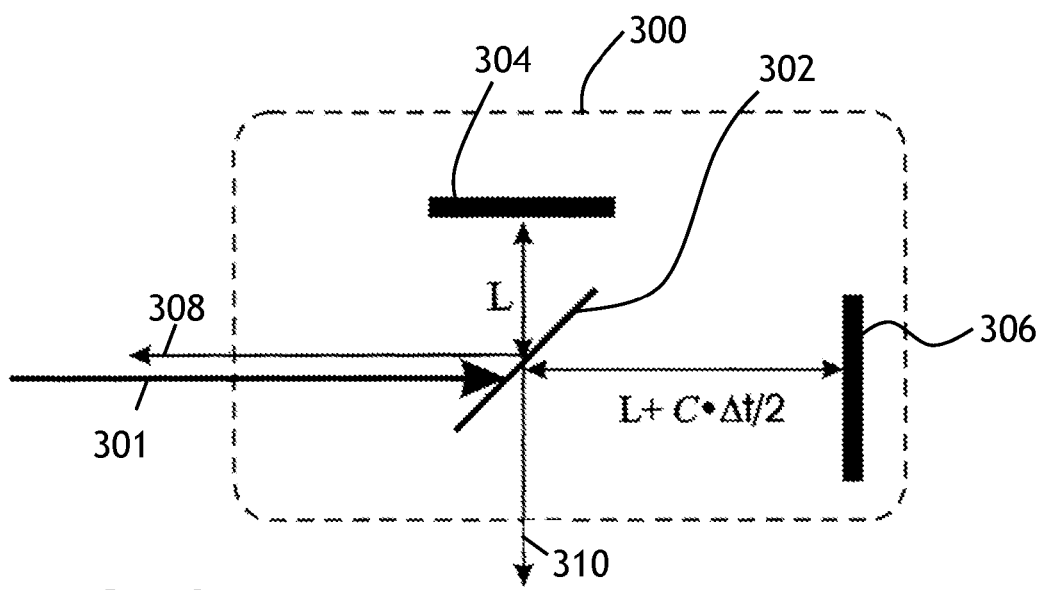
FIG. 3 is a plan view of a prior-art free-space Michelson interferometer suitable for DPSK demodulation.
Figure 4A:
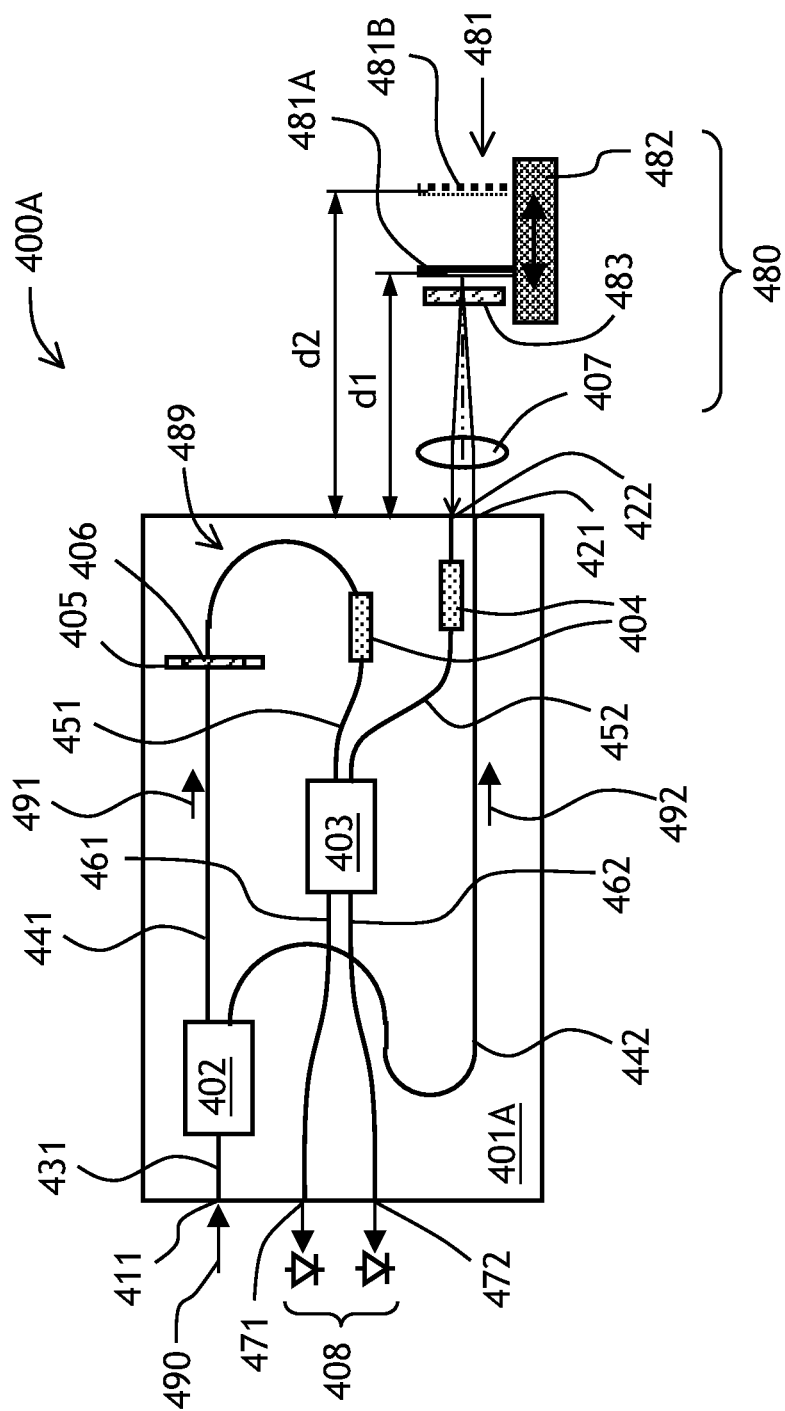
FIGS. 4A to 4D are schematic views of embodiments of DPSK/DQPSK interferometers of the invention including a waveguide loopback; a waveguide V-joint; two free-space delay lines; and a star coupler, respectively.

Referring to FIG. 4A, a differential phase-shift keying (DPSK) optical interferometer 400A of the invention includes integrally formed planar lightwave circuit (PLC) 401A and a free-space optical delay line 480 optically coupled to the PLC 401A. The PLC 401A includes an input port 411, first and second intermediate ports 421 and 422, first and second output ports 471 and 472, an optical waveguide splitter 402, an optical waveguide coupler 403, and two phase shifting elements (heaters) 404. The splitter 402 has an input waveguide 431, coupled to the input port 411, and first and second output waveguides 441 and 442. The second output waveguide 442 of the splitter 402 is coupled to the first intermediate port 421. The coupler 403 includes first and second input waveguides 451 and 452 and first and second output waveguides 461 and 462. The first input waveguide 451 of the coupler 403 is coupled to the first output waveguide 441 of the splitter 402. The second input waveguide 452 of the coupler 403 is coupled to the second intermediate port 422. The first and second output waveguides 461 and 462 of the coupler 403 are coupled to the first and second output ports 471 and 472, respectively. The free-space optical delay line 480 is coupled between the first and the second intermediate ports 421 and 422, respectively, of the planar lightwave circuit 401A. The phase shifting elements (heaters) 404 are disposed over the first and second input waveguides 451 and 452 of the coupler 403. Other types of phase shifting elements known to a person skilled in the art can be used in place of the heaters 404.

In the embodiment shown, the PLC 401A includes an optional half-wave plate 406 disposed within an optional groove 405 in the PLC 401A. A lens 407 couples optical signals to and from the free space optical delay line 480, which includes a reflector 481. The reflector 481 is movable by a translation stage 482 between positions 481A and 481B. An optional quarter-wave plate 483 is placed between the reflector 480 and the intermediate ports 421, 422. The waveplates 406 and 483 interchange polarization of light propagating therethrough, which facilitates reduction of polarization sensitivity of the interferometer 400A. The quarter-wave plate 483 interchanges polarizations because light passes through the quarter-wave plate 483 twice, before and after reflection from the mirror 481. The quarter-wave plate 483 in a double-pass is equivalent to the half-wave plate 406 in a single-pass.

In operation, an input optical signal 490 coupled to the input port 411 propagates in the input waveguide 431 of the splitter 402, which splits the input optical signal 490 into first and second optical signals 491 and 492 propagating in the first and second output waveguides 441 and 442, respectively. The second optical signal 492 is delayed by the free space optical delay line 480 relative to the first optical signal 491 by a delay time corresponding to a bit duration of the input optical signal 490. The delayed second optical signal 492 interferes with the first optical signal 491 in the coupler 403, and the interference signal is detected by a differential pair of photodetectors 408 coupled to the output ports 471 and 472 of the PLC 401A. To maintain DPSK functionality, the phase shifters 404 are operated to generate and maintain a relative optical phase shift between the first and second optical signals 491 and 492 of 180 degrees, or $\pi$. Only one phase shifting element 404 can be used for this purpose, but two are preferable for thermal management reasons.

In the embodiment shown, the free space optical delay line 480 is a variable delay line. At the position 481A, the reflector 481 is at a distance d1 from the PLC 401A. The distance d1 corresponds to a bit rate of, for example, 100 GBit/s having one bit duration of 10 ps. The translation stage 482 can be operated to bring the reflector 481 to the position 481B at a distance d2 from the PLC 401A corresponding to a bit rate of 40 GBit/s having one bit duration of 25 ps. Thus, the adjustability of at least 15 ps, corresponding to free space distance difference d2−d1 of at least 2.25 mm, is required to ensure that the interferometer 400A can be used for demodulation of DPSK modulated optical signals at both 100 GBit/s and 40 GBit/s bit rates.

In applications where the bit rate is constant, the free space optical delay line 480 can be a fixed (albeit preferably, one-time adjustable during calibration) delay line. It is advantageous to have a free space delay line even when it is fixed, because it reduces overall size, as well as thermal and polarization sensitivity of the interferometer 400A. Advantageously, the magnitude of the delay of the free space optical delay line 480 can be set to slightly deviate from one bit duration, which has been found by the inventors to further improve stability of DPSK demodulation.

Any element having optical power, that is, a capability to focus light, can be used in place of the lens 407. Furthermore, micro-collimators or microlenses, not shown, can be separately coupled to the first and second intermediate ports 421 and 422 of the PLC 401A to collimate/focus beams of light out of the second intermediate port 422 and into the first intermediate port 421. The movable reflector 481 can include a metal or dielectric mirror, a retro-reflecting cube, a Porro prism, etc. The heaters 404 can be disposed for selectively heating at least one of: the first 441 and second 442 output waveguides of the splitter 402 and the first 451 and second 452 input waveguides of the coupler 403.

Figure 4B:
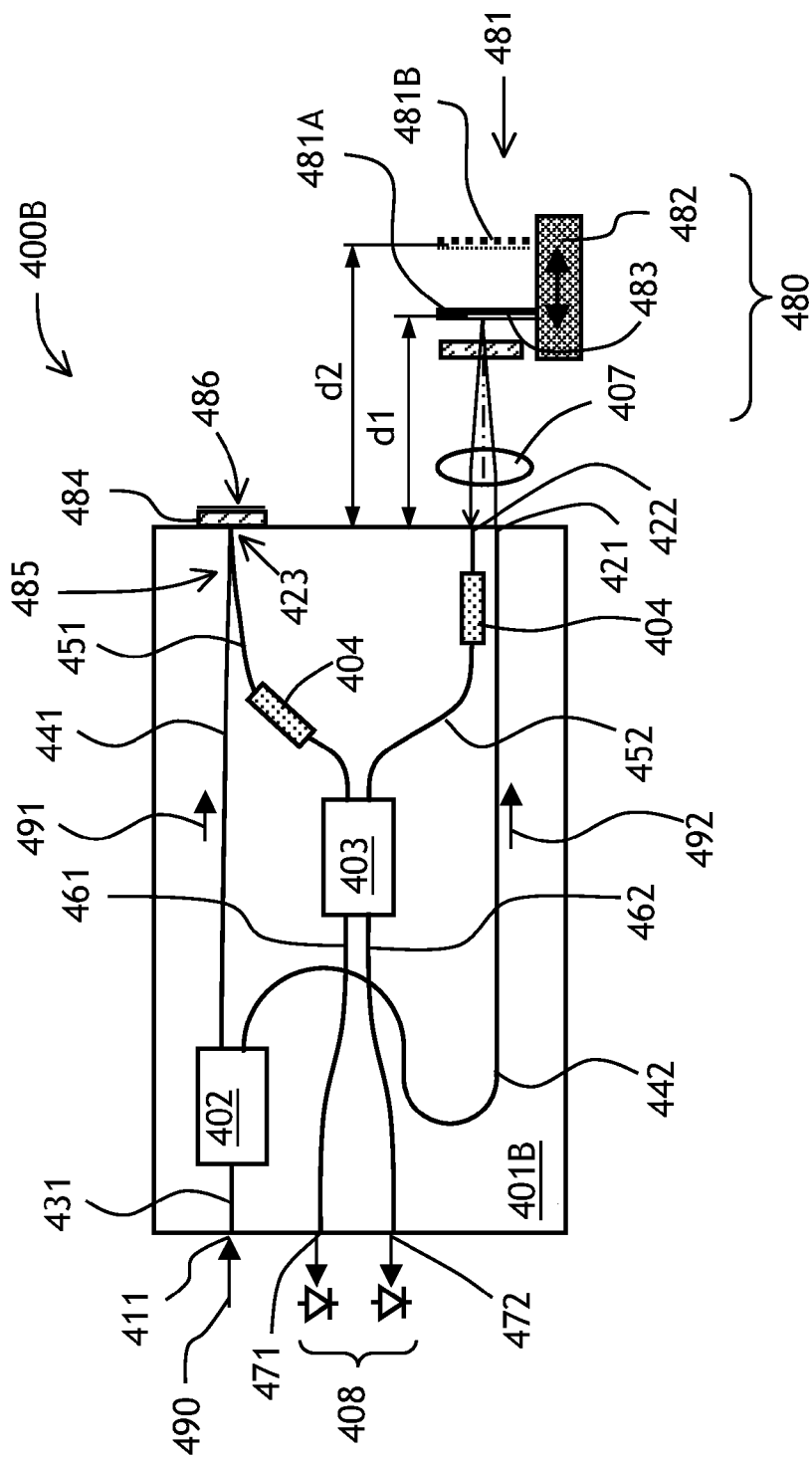

Referring now to FIG. 4B, a DPSK optical interferometer 400B is similar to the DPSK optical interferometer 400A of FIG. 4A, one difference being that the first output waveguide 441 of the splitter 402 and the first input waveguide 451 of the coupler 403 form a V-joint 485. A planar lightwave circuit 401B comprises a third intermediate port 423 at the tip of the V-joint. A reflector 486 is disposed at the third intermediate port 423. The reflector 486 optically couples the first output waveguide 441 of the splitter 402 to the first input waveguide 451 of the coupler 403. An optional quarter-wave plate 484 rotates polarization of the first optical signal 491 as it propagates twice through the quarter-wave plate 484, for reduction of polarization sensitivity. Advantageously, the V-joint 485 allows one to avoid having a waveguide loop 489 in FIG. 4A, which makes the PLC 401B of FIG. 4B more compact than the PLC 401A of FIG. 4A. The distances d1 and d2 between the reflector 481 and the PLC 401B in FIG. 4B are also reduced as compared to the distances d1 and d2 in FIG. 4A.

Figure 4C:
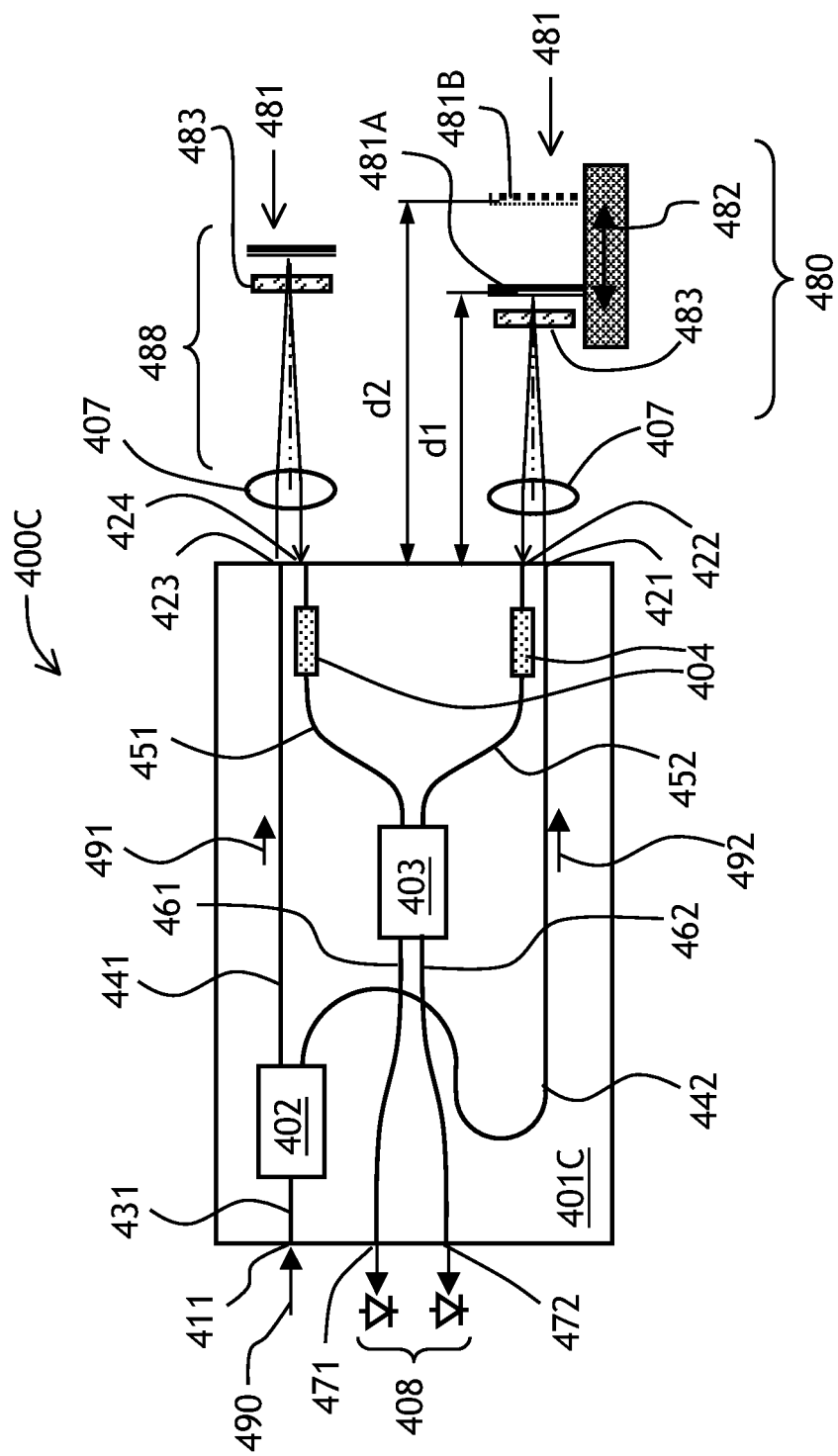

Turning now to FIG. 4C, a DPSK optical interferometer 400C is similar to the DPSK optical interferometer 400A of FIG. 4A, one difference being that a planar lightwave circuit 401C comprises the third intermediate port 423 coupled to the first output waveguide 441 of the splitter 402, and a fourth intermediate port 424 coupled to the first input waveguide 451 of the coupler 403. The interferometer 400C further includes a second lens 407 and a second, fixed free space optical delay line 488 coupled between the third and the fourth intermediate ports 423 and 424, for delaying the first optical signal 491 relative to the second optical signal 492. Advantageously, having two free space optical delay lines 480 and 488 allows a further reduction of size of the interferometer 400C and thermal sensitivity of the optical path length, because thermal dependences of optical path lengths of the two free space optical delay lines 480 and 488 tend to compensate one another.

Figure 4D:
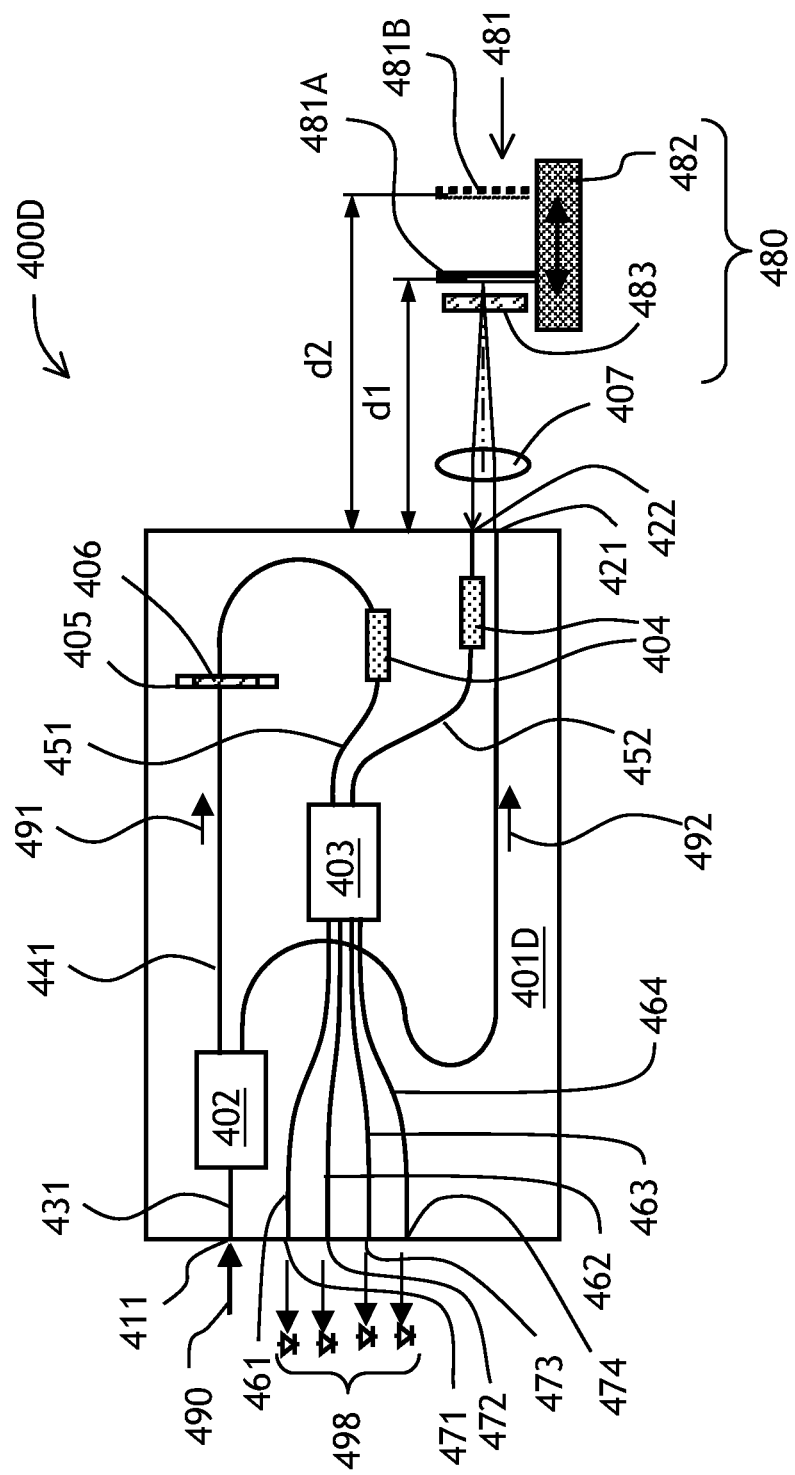

Referring to FIG. 4D, a DQPSK optical interferometer 400D is similar to the DPSK optical interferometer 400A of FIG. 4A, the difference being that a planar lightwave circuit 401D further includes third and fourth output ports 473 and 474, respectively, and the coupler 403 is a star coupler further comprising third and fourth output waveguides 463 and 464 coupled to the third and fourth output ports 473 and 474, respectively. Photodetectors 498 are coupled to the four output ports 471 to 474. Optical interference of the first and second optical signals 491 and 492 in the star coupler 403 causes the output signal to be predominantly sent to one of the output waveguides 461 to 464 in dependence on phase difference between the first and second optical signals 491 and 492. The output signal is detected by four photodetectors 498 coupled, one by one, to the four output ports 471 to 474. The four photodetectors 498 can be grouped into differential pairs.

Figure 5A:
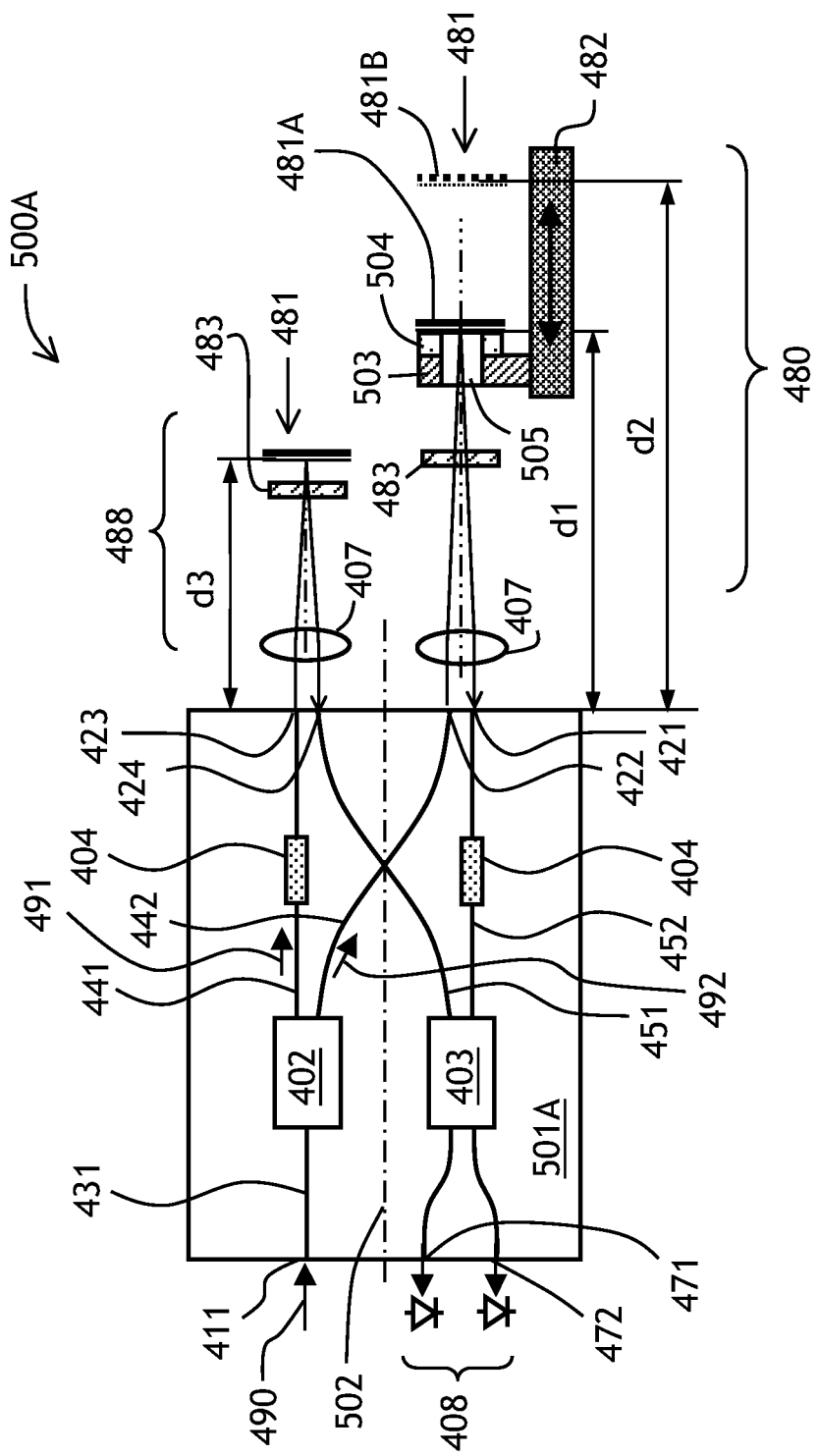
FIGS. 5A and 5B are schematic views of embodiments of a symmetric DPSK/DQPSK interferometer of the invention.

Turning now to FIG. 5A, a DPSK optical interferometer 500A is similar to the DPSK optical interferometer 400C of FIG. 4C, one difference being that a planar lightwave circuit 501A has a symmetry axis 502, and elements of the following pairs: the splitter 402 and the coupler 403; the first output waveguide 441 of the splitter 402 and the second output waveguide 452 of the coupler 403; the second output waveguide 442 of the splitter 402 and the first output waveguide 451 of the coupler 403; the second and the fourth intermediate ports 422 and 424; and the first and the third intermediate ports 421 and 423 are disposed symmetrically with respect to the symmetry axis 502. The symmetrical placement of waveguides and couplers results in a reduced sensitivity of the interferometer 500A to thermal gradients and mechanical stress patterns, since the thermal gradients and mechanical stress patterns tend to be symmetrical with respect to the axis of symmetry 502 of the PLC 501A.

Since the optical path lengths of the first and the second optical signals 491 and 492 within the PLC 501A are equal, the one-bit optical path difference is generated solely in the free space delay lines 480 and 488. Therefore, $$\Delta t_1 = \frac{d_3 - d_1}{c/n} \quad (1)$$

$$\Delta t_2 = \frac{d_3 - d_2}{c/n} \quad (2)$$

wherein $\Delta t_1$ and $\Delta t_2$ are one-bit delays for two different bit rates, c is speed of light in vacuum and n is the refractive index of air.

The refractive index of air exhibits temperature dependence of about −1 ppm/° C. Over distances of few millimeters of the light travel in air, the air refractive index temperature dependence can create a noticeable phase error. For example, for d3−d1 of 1.171 mm, the phase error is about 9 degrees per 60° C. temperature change. To compensate for such an error, the mirror 481 of the lower delay line 480 can be mounted to a ring 504, which is mounted to a post 503 extending from the translation stage 482. The light propagates through an opening 505 in the post 503 and the ring 504, reflects from the mirror 481, and propagates back. The thermal expansion coefficient of the ring 504 is selected so as to compensate for optical path length variation with temperature due to thermal dependence of refractive index of air or another gas in which the free space optical delay line 480 is disposed. Thermal expansion or contraction of the ring 504 causes the reflector 481 to shift away from or towards the intermediate ports 421, 422, thereby compensating for thermal dependence of refractive index of air or another filling gas. This mounting arrangement can also be used to mount the mirror 481 in the interferometers 400A to 400D.

Figure 5B:
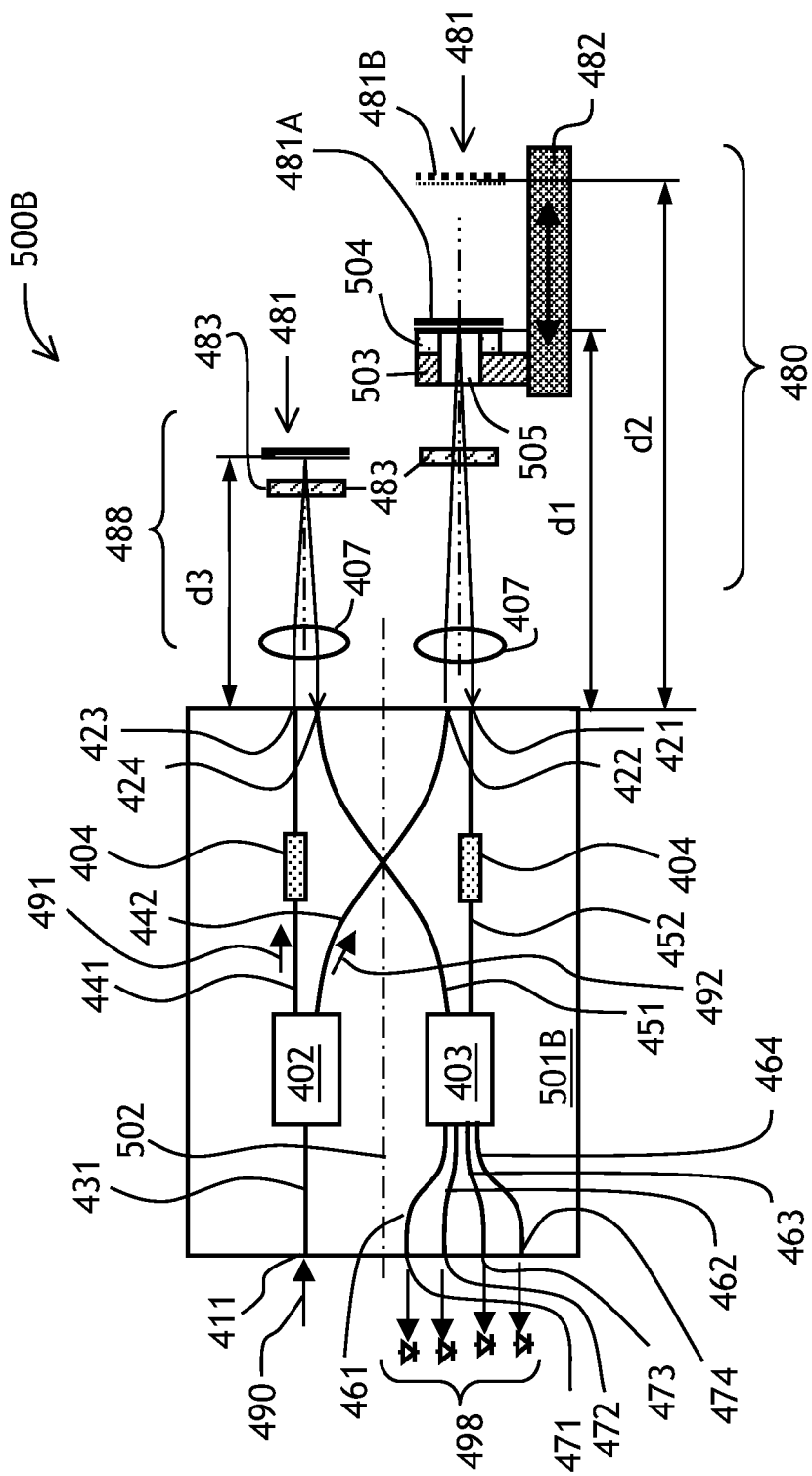

Turning now to FIG. 5B, a DQPSK optical interferometer 500B is similar to the DPSK optical interferometer 500A of FIG. 5A, the difference being that a planar lightwave circuit 501B further includes third and fourth output ports 473 and 474, respectively, and the coupler 403 is a star coupler further comprising third and fourth output waveguides 463 and 464 coupled to the third and fourth output ports 473 and 474, respectively. The photodetectors 498 are coupled to the four output ports 471 to 474. Optical interference of the first and second optical signals 491 and 492 in the star coupler 403 causes the output signal to be predominantly sent to one of the output waveguides 461 to 464 in dependence on phase difference between the first and second optical signals 491 and 492. The output signal is detected by four photodetectors 498 coupled, one by one, to the four output ports 471 to 474. The four photodetectors 498 can be grouped into differential pairs.

Figure 6:
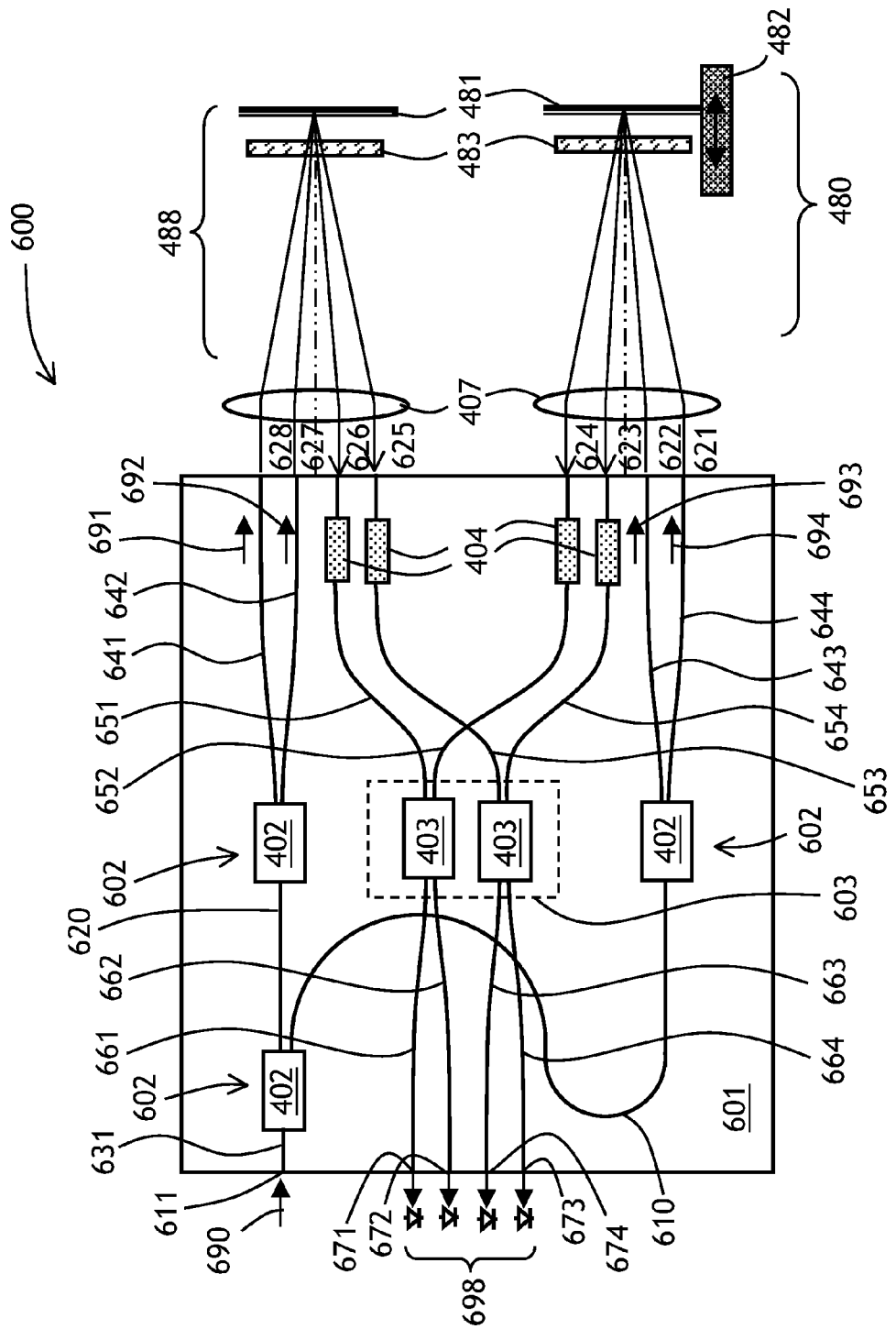
FIG. 6 is a schematic view of an embodiment of a DQPSK interferometer of the invention.

Referring to FIG. 6, a differential quadrature phase-shift keying (DQPSK) optical interferometer 600 of the invention includes a PLC 601, the variable free-space optical delay line 480 coupled to the PLC 601, and the fixed free-space optical delay line 488 coupled to the PLC 601. The free-space optical delay lines 480 and 488 are similar to those of interferometers 400C, 500A, and 500B of FIGS. 4C, 5A, and 5B, respectively. The PLC 601 includes an input port 611, first to eighth intermediate ports 621 to 628, respectively, first to fourth output ports 671 to 674, respectively, an 1×4 optical waveguide splitter 602 including three 1×2 splitters 402 connected with an s-bent waveguide 610 and a straight waveguide 620, a 4×4 optical waveguide coupler 603 including two 2×2 couplers 403, and four phase shifting elements (heaters) 404. The splitter 602 has an input waveguide 631 coupled to the input port 611 and first to fourth output waveguides 641 to 644, respectively, for splitting an input optical signal 690 coupled to the input port 611 and propagating in the input waveguide 631 into first to fourth optical signals 691 to 694, propagating in the first to fourth output waveguides 641 to 644, respectively, of the splitter 602. The fourth output waveguide 644 of the splitter 602 is coupled to the first intermediate port 621, and the third output waveguide 643 of the splitter 602 is coupled to the second intermediate port 622. The coupler 603 has first to fourth input waveguides 651 to 654 and first to fourth output waveguides 661 to 664, respectively. The first and the second output waveguides 641 and 642 of the splitter 602 are coupled to the third and the first input waveguides 653 and 651 of the coupler 603, respectively, through the fixed free space delay line 488 coupled between fifth and eight; and sixth and seventh intermediate ports 625 and 628; 626 and 627, respectively. The first to fourth output waveguides 661 to 664 of the coupler 603 terminate in the first to fourth output ports 671 to 674, respectively. The fourth 654 and the second 652 input waveguides of the coupler 603 are coupled to the third 623 and the fourth 624 intermediate ports, respectively. The variable free space optical delay line 480 is coupled between the first and the fourth intermediate ports 621 and 624, respectively; and between the second and the third intermediate ports 622 and 623, respectively, of the planar lightwave circuit 601.

In operation, the third and the fourth optical signals 693 and 694, respectively, are delayed relative to the first and the second optical signals 691 and 692, respectively, by a delay time corresponding to a bit duration Δt of the input optical signal 690. In the embodiment shown, the free space delay lines 480 and 488 are substantially of a same length, the delay being generated mostly by the length difference between S-bent waveguide 610 and the straight waveguide 620. One advantage of having the free space delay lines 480 and 488 of a same length is that thermal dependence of optical path length due to variation of refractive index of air is compensated. However, when the mirror 481 of the variable free space delay line 480 is moved by the translation stage 482, the lengths of the free space delay lines 480 and 488 will no longer be equal, so that some form of thermal compensation of optical path length may be required. In another embodiment, the free space delay lines 480 and 488 are always of different length. The thermal compensation can include adjusting phase of the phase shifters 404 and/or using the ring 504, mounted to a post 503 fixed to the translation stage 482, as shown in FIG. 5A for the case of the interferometer 500A.

Still referring to FIG. 6, although four phase shifters 404 are shown, only three can be used for generating relative optical phase shifts between the first 691 and the second 692; the second 692 and the third 693; and the third 693 and the fourth 694 optical signals propagating in the respective input ports 651 to 654 of the coupler 603. The coupler 603 can be made in form of a 4×4 star coupler. Also, the splitter 602 can include a single 1×4 splitter in place of three 1×2 splitters 402 coupled with the S-shaped waveguide 610 and the straight waveguide 620. Waveguide loopback and/or a V-joint can be used in place of the fixed free space delay line 488, similarly to those shown in FIGS. 4A and 4B. When the waveguide loopback is used, the PLC 601 has only four intermediate ports 621 to 624. The free space delay line 480 can be a fixed delay line, although the variable delay line is preferable, because it allows demodulation of signals at different bit rates as explained above. Furthermore, the waveguides/ports of the interferometer 600 can be made symmetrical, similar to the interferometers 500A and 500B of FIGS. 5A and 5B, respectively.

Figure 7:
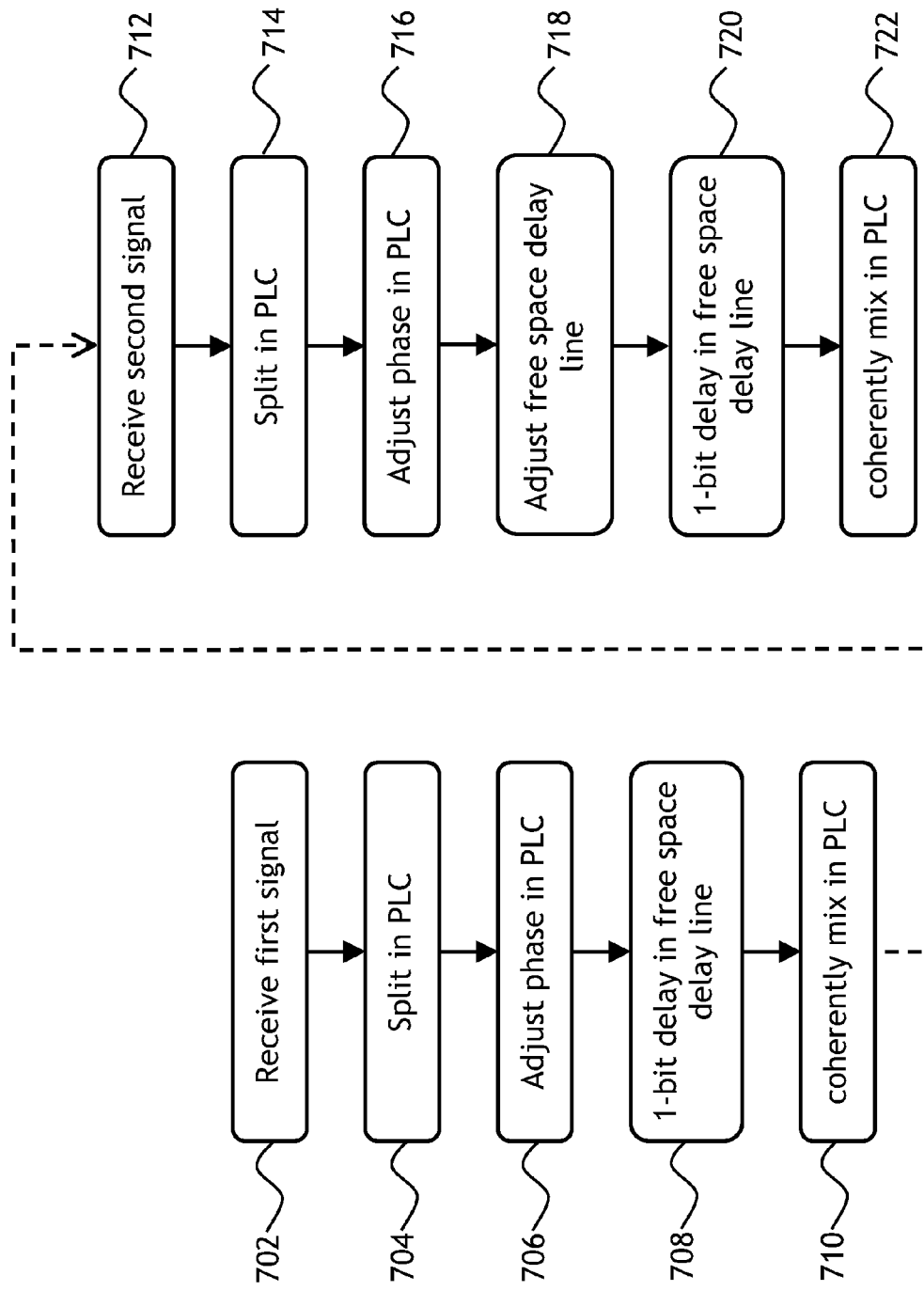
FIG. 7 is a block diagram of a method of demodulation of a DPSK/DQPSK modulated optical signal according to the invention.

Turning now to FIG. 7, a method of differential phase shift keying demodulation of a phase-modulated optical signal is shown. The method can be used with the demodulator 400A of FIG. 4A including the planar waveguide circuit 401A optically coupled to the free-space delay line 480, the planar waveguide circuit 401A having the waveguide splitter 402, the phase shifters 404, and the waveguide coupler 403 integrally formed therein as described above. In a step 702, a first optical signal having a first bit duration, represented by the phase-modulated optical signal 490, is received at the input port 411 of the demodulator 400A. In a step 704, the first optical signal 490 is split by the waveguide splitter 402 into the first and second portions (signals) 491 and 492 having substantially equal magnitude. In a step 706, relative phase of the two portions 491 and 492 of the first signal 490 is adjusted by operating at least one of the phase shifters 404. In a step 708, the second portion 492 is delayed relative to the first portion 491 in the free-space delay line 480 by a time substantially equal to the first bit duration. The steps 704 to 708 may be performed in a different order or simultaneously. Then, in a step 710, the two portions of the first optical signal are coherently mixed in the waveguide coupler 403.

Advantageously, the demodulator 400A of FIG. 4A allows demodulation of optical signals having differing bit durations. Still referring to FIG. 7, in a step 712, a second optical signal having a second bit duration different from the first bit duration is received at the input port 411 of the PLC 601. In a step 714, the second optical signal is split by the splitter 402 into two portions of equal magnitude. In a step 716, relative optical phase of the two portions is adjusted by operating at least one of the phase shifters 404. In a step 718, the free-space delay line 480 is adjusted to provide a delay substantially equal to the second bit duration. In a step 720, one of the two portions of the second optical signal is delayed relative to the other of the two portions of the second optical signal by a time substantially equal to the second bit duration, using the free-space delay line 480. Steps 714 to 720 may be performed in a different order or simultaneously. Then, in a step 722, the two portions are coherently mixed in the waveguide coupler 403.

The method of FIG. 7 is applicable for operation with any of the interferometers 400B to 400D, 500A, 500B, and 600 of FIGS. 4B to 4D, 5A 5B, and 6, respectively. For the case of the DQPSK interferometer 600 of FIG. 6, the input optical signal 690 is split not in two but in four portions 691 to 694, respectively, which are similarly processed. One might envision splitting the input signal 690 into a different number of portions, depending on the couplers used and the modulation scheme involved.

Figure 8:
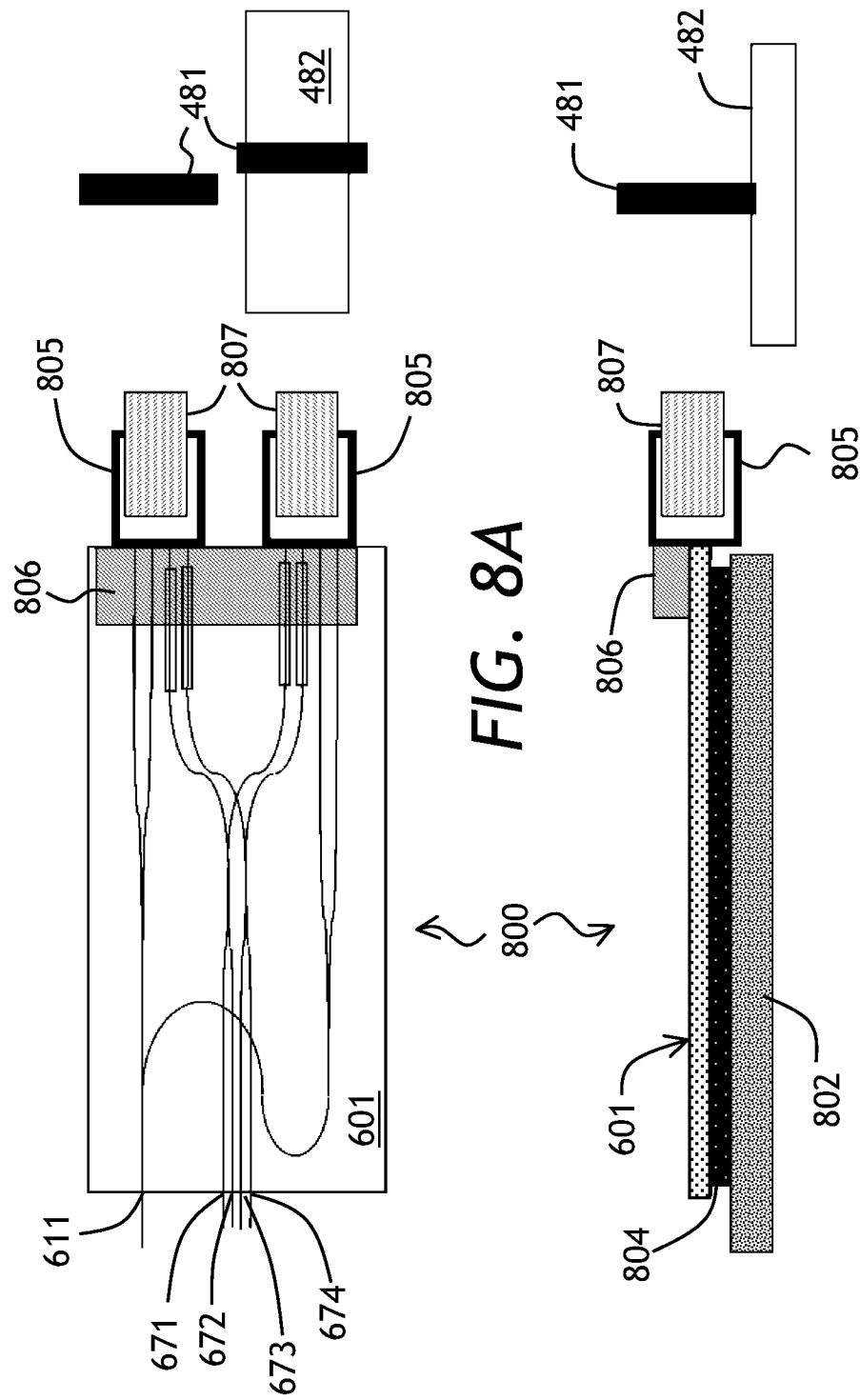
FIGS. 8A and 8B are plan and side views, respectively, of the DQPSK interferometer of FIG. 6.

Referring now to FIGS. 8A and 8B, a DQPSK interferometer 800 is shown. The DQPSK interferometer 800 is a mounted version of the DQPSK interferometer 600 of FIG. 6. In the DQPSK interferometer 800 of FIGS. 8A and 8B, the PLC 601 is mounted on a ceramic plate 802 with a thermal epoxy 804. The ceramic plate 802 includes a heater and a thermal sensor, not shown, for maintaining the ceramic plate 802 at a steady temperature. Gradient index (GRIN) lenses 807, corresponding to the lenses 607 of FIG. 6, are mounted in mounts 805. The mounts 805 are affixed, for example soldered or epoxied, to a Pyrex™ plate 806 mounted on the PLC 601. The top mirror 481 in FIG. 8A is a fixed mirror, and the bottom mirror 481 is a movable mirror mounted to a miniature piezoelectric motor-driven translation stage 482.

Of course, various types of translation stages, motors, and lenses can be used, as appreciated by those of skill in the art.

Figure 9:
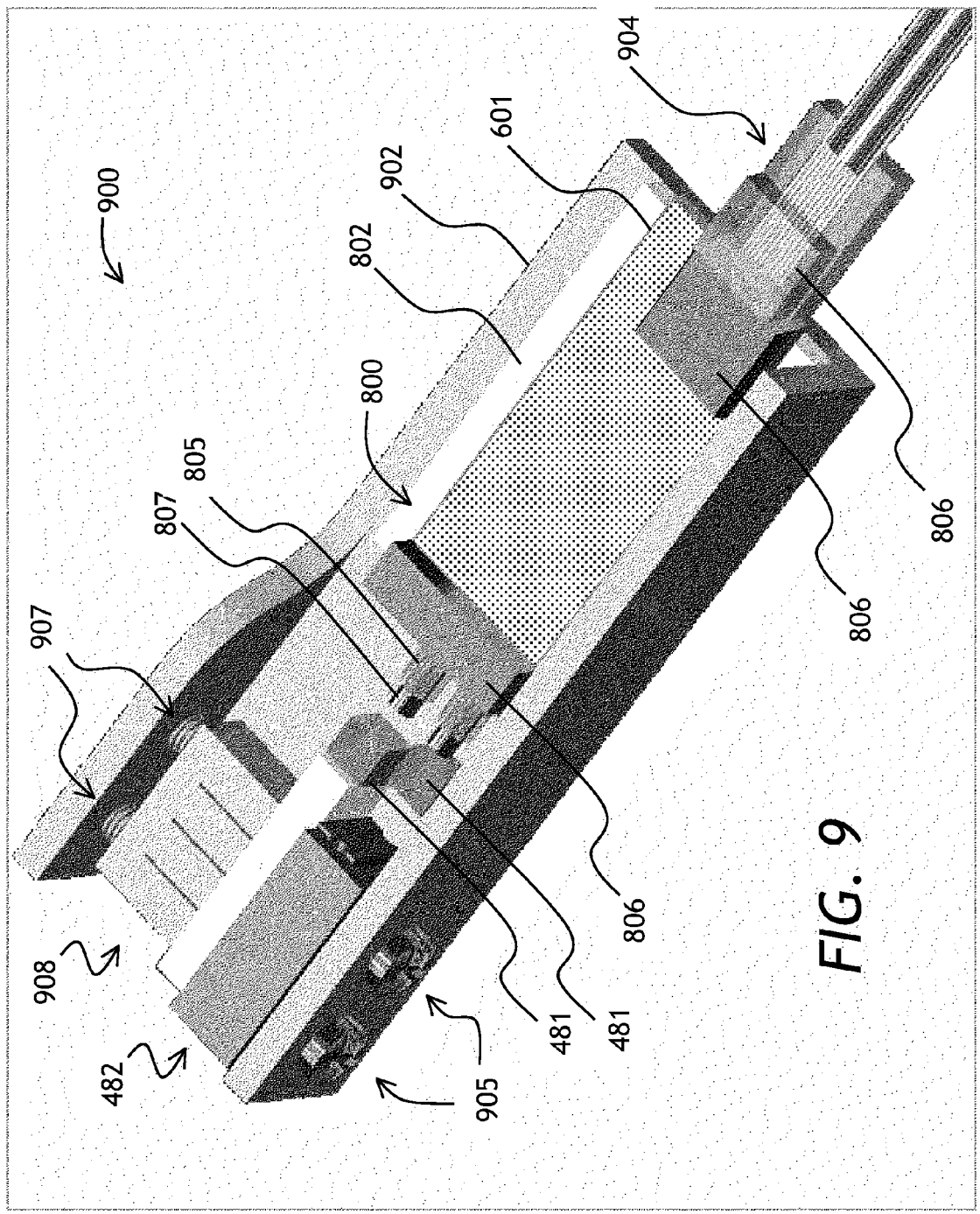
FIG. 9 is a three-dimensional rendering of a prototype of a DQPSK interferometer of FIGS. 8A and 8B.

Turning to FIG. 9, a prototype 900 of the mounted DQPSK interferometer 800 has a bracket-like package 902 on which the ceramic plate 802 is mounted. The translation stage 482 is mounted to the package 902 with a pair of screws 905. Springs 907 and a pusher 908 are used to prevent wobble of the stage 482, for angular stability of the movable reflector 481. A fiber array 904 is attached to the PLC 601 using the Pyrex plates 806. The fiber array 904 couples the input port 611 seen in FIGS. 6 and 8A to a source of a modulated optical signal, not shown, and the output ports 671 to 674 to photodetectors, not shown in FIG. 9.

What is claimed is:

1. An optical interferometer comprising:
   a planar lightwave circuit including:
   an input port;
   first and second intermediate ports;
   first and second output ports;
   an optical waveguide splitter comprising an input waveguide coupled to the input port and first and second output waveguides, for splitting an input optical signal coupled to the input port and propagating in the input waveguide into first and second optical signals propagating in the first and second output waveguides, respectively, wherein the second output waveguide of the splitter is coupled to the first intermediate port;
   an optical waveguide coupler comprising first and second input waveguides and first and second output waveguides, wherein the first input waveguide of the coupler is coupled to the first output waveguide of the splitter, the second input waveguide of the coupler is coupled to the second intermediate port, and the first and second output waveguides of the coupler are coupled to the first and second output ports, respectively; and
   a phase shifting element for generating a relative optical phase shift between optical signals propagating in the first and second input waveguides of the coupler; and
   a first free space optical delay line coupled between the first and the second intermediate ports of the planar lightwave circuit, for delaying the second optical signal relative to the first optical signal by a delay time corresponding to a bit duration of the input optical signal, wherein the first free space optical delay line comprises a reflector and an element having optical power, for collimating light emitted from the first intermediate port, and for focusing light into the second intermediate port.

2. The interferometer of claim 1, wherein the planar lightwave circuit further comprises third and fourth output ports, and wherein the coupler is a star coupler further comprising third and fourth output waveguides coupled to the third and fourth output ports.

3. The interferometer of claim 1, wherein the phase shifting element comprises a heater element for selectively heating at least one of: the first and second output waveguides of the splitter and the first and second input waveguides of the coupler.

4. The interferometer of claim 1, further comprising a waveplate disposed between the first intermediate port and the reflector, for rotating polarization of the second optical signal propagating between the first and the second intermediate ports.

5. The interferometer of claim 1, further comprising a mount to which the reflector is mounted, wherein the mount has a thermal expansion coefficient selected so as to compensate for an optical path length variation with temperature due to thermal dependence of refractive index of a gas in which the free space optical delay line is disposed.

6. An optical interferometer comprising:
   a planar lightwave circuit including:
   an input port;
   first and second intermediate ports;
   first and second output ports;
   an optical waveguide splitter comprising an input waveguide coupled to the input port and first and second output waveguides, for splitting an input optical signal coupled to the input port and propagating in the input waveguide into first and second optical signals propagating in the first and second output waveguides, respectively, wherein the second output waveguide of the splitter is coupled to the first intermediate port;
   an optical waveguide coupler comprising first and second input waveguides and first and second output waveguides, wherein the first input waveguide of the coupler is coupled to the first output waveguide of the splitter, the second input waveguide of the coupler is coupled to the second intermediate port, and the first and second output waveguides of the coupler are coupled to the first and second output ports, respectively; and
   a phase shifting element for generating a relative optical phase shift between optical signals propagating in the first and second input waveguides of the coupler; and
   a first free space optical delay line coupled between the first and the second intermediate ports of the planar lightwave circuit, wherein the first free space optical delay line is a variable delay line comprising a movable reflector, for delaying the second optical signal relative to the first optical signal by a variable delay time corresponding to a variable bit duration of the input optical signal.

7. The interferometer of claim 6, wherein the delay time of the variable delay line is variable by at least 15 picoseconds.

8. An optical interferometer comprising:
   a planar lightwave circuit including:
   an input port;
   first, second, third, and fourth intermediate ports;
   first and second output ports;
   an optical waveguide splitter comprising an input waveguide coupled to the input port and first and second output waveguides, for splitting an input optical signal coupled to the input port and propagating in the input waveguide into first and second optical signals propagating in the first and second output waveguides, respectively, wherein the first output waveguide of the splitter is coupled to the third intermediate port, and the second output waveguide of the splitter is coupled to the first intermediate port;
   an optical waveguide coupler comprising first and second input waveguides and first and second output waveguides, wherein the first input waveguide of the coupler is coupled to the fourth intermediate port, the second input waveguide of the coupler is coupled to the second intermediate port, and the first and second output waveguides of the coupler are coupled to the first and second output ports, respectively; and
   a phase shifting element for generating a relative optical phase shift between optical signals propagating in the first and second input waveguides of the coupler;

a first free space optical delay line coupled between the first and the second intermediate ports of the planar lightwave circuit, for delaying the second optical signal relative to the first optical signal by a delay time corresponding to a bit duration of the input optical signal; and a second free space optical delay line coupled between the third and the fourth intermediate ports of the planar lightwave circuit, for delaying the first optical signal relative to the second optical signal.

9. The interferometer of claim 8, wherein the planar lightwave circuit has an axis of symmetry, wherein elements of the following pairs:
the splitter and the coupler;
the first output waveguide of the splitter and the second output waveguide of the coupler;
the second output waveguide of the splitter and the first output waveguide of the coupler;
the second and the fourth intermediate ports; and
the first and the third intermediate ports;
are disposed symmetrically with respect to the axis of symmetry.

10. An optical interferometer comprising:
a planar lightwave circuit including
an input port;
first, second, third, and fourth intermediate ports;
first, second, third, and fourth output ports;
an optical waveguide splitter comprising an input waveguide coupled to the input port and first, second, third, and fourth output waveguides, for splitting an input optical signal coupled to the input port and propagating in the input waveguide into first, second, third, and fourth optical signals propagating in the first, second, third, and fourth output waveguides, respectively, of the splitter, wherein the fourth and the third output waveguides of the splitter are coupled to the first and the second intermediate ports, respectively;
an optical waveguide coupler comprising first, second, third, and fourth input waveguides and first, second, third, and fourth output waveguides,
wherein the first and the second output waveguides of the splitter are coupled to the third and the first input waveguides of the coupler, respectively;
wherein the fourth and the second input waveguides of the coupler are coupled to the third and the fourth intermediate ports, respectively; and
wherein the first, the second, the third, and the fourth output waveguides of the coupler are coupled to the first, the second, the third, and the fourth output ports, respectively; and
at least three phase shifting elements for generating relative optical phase shifts between the first and the second; the second and the third; and the third and the fourth optical signals propagating in the respective input waveguides of the coupler; and
a first free space optical delay line coupled between the first and the fourth intermediate ports; and between the second and the third intermediate ports of the planar lightwave circuit, for delaying the third and the fourth optical signals relative to the first and the second optical signals by a delay time corresponding to a bit duration of the input optical signal, wherein the first free space optical delay line comprises a reflector and an element having optical power, for collimating light emitted from the first intermediate port, and for focusing light into the second intermediate port.

11. The interferometer of claim 10, wherein the first free space optical delay line is a variable delay line, for delaying the third and the fourth optical signals relative to the first and the second optical signals, respectively, by a variable delay time corresponding to a variable bit duration of the input optical signal.

12. The interferometer of claim 11, wherein the reflector is movable.

13. The interferometer of claim 12, further comprising a waveplate disposed between the first intermediate port and the movable reflector, for rotating polarization of the fourth optical signal propagating between the first and the fourth intermediate ports; and of the third optical signal propagating between the second and the third intermediate ports.

14. The interferometer of claim 10, wherein the planar lightwave circuit comprises fifth, sixth, seventh, and eights intermediate ports coupled to the third and the first input waveguides of the coupler and the second and the first output waveguides of the splitter, respectively,
the interferometer further comprising a second free space optical delay line coupled between the fifth and the eighth; and the sixth and the seventh intermediate ports of the planar lightwave circuit, for delaying the first and the second optical signals relative to the third and the fourth optical signals.

15. The interferometer of claim 14, wherein the splitter comprises three 1×2 optical waveguide splitters, and wherein the coupler comprises two 2×2 optical waveguide couplers.

16. A method of differential phase shift keying demodulation of a first phase-modulated optical signal having a first bit duration, the method comprising:
(a) providing a planar waveguide circuit optically coupled to a free-space delay line, the planar waveguide circuit having a waveguide splitter, a phase shifter, and a waveguide coupler integrally formed therein;
(b) receiving the first optical signal in the planar waveguide circuit;
(c) splitting the first optical signal into two portions of substantially equal magnitude using the waveguide splitter;
(d) adjusting relative optical phase of the two portions of the first optical signal using the phase shifter;
(e) variably delaying one of the two portions relative to the other of the two portions of the first optical signal by a time substantially equal to the first bit duration, using the free-space delay line comprising a movable reflector; and
(f) upon completion of steps (b) through (e), coherently mixing the two portions of the first optical signal in the waveguide coupler.

17. The method of claim 16, further comprising
(g) receiving a second phase-modulated optical signal in the planar waveguide circuit, the second signal having a second bit duration different from the first bit duration;
(h) splitting the second optical signal into two portions of substantially equal magnitude using the waveguide splitter;
(i) adjusting relative optical phase of the two portions of the second optical signal using the phase shifter;
(j) adjusting the free-space delay line to provide a delay substantially equal to the second bit duration;
(k) upon completion of step (j), delaying one of the two portions relative to the other of the two portions of the second optical signal by a time substantially equal to the second bit duration, using the free-space delay line; and
(l) upon completion of steps (g) through (k), coherently mixing the two portions of the optical signal in the waveguide coupler.

* * * * *